United States Patent
Noack (10) Patent No.: US 10,300,794 B2
(45) Date of Patent: May 28, 2019

(54) ELECTRICAL CIRCUIT FOR A MOTOR VEHICLE AND METHOD FOR ESTABLISHING CONTACT AND/OR TERMINATING CONTACT OF A VEHICLE WITH A VEHICLE-EXTERNAL ELECTRICAL NETWORK

(71) Applicant: SIEMENS MOBILITY GMBH, Munich (DE)

(72) Inventor: Maik Noack, Spreewaldheide / Ot Laasow (DE)

(73) Assignee: Siemens Mobility GmbH, Munich (DE)

( * ) Notice: Subject to any disclaimer, the term of this patent is extended or adjusted under 35 U.S.C. 154(b) by 92 days.

(21) Appl. No.: 15/504,574

(22) PCT Filed: Aug. 14, 2015

(86) PCT No.: PCT/EP2015/068730
§ 371 (c)(1),
(2) Date: Feb. 16, 2017

(87) PCT Pub. No.: WO2016/030210
PCT Pub. Date: Mar. 3, 2016

(65) Prior Publication Data
US 2017/0240051 A1 Aug. 24, 2017

(30) Foreign Application Priority Data

Aug. 28, 2014 (DE) .......................... 10 2014 217 219

(51) Int. Cl.
*B60L 5/42* (2006.01)
*B60L 9/22* (2006.01)
*B60M 1/36* (2006.01)

(52) U.S. Cl.
CPC .................. *B60L 5/42* (2013.01); *B60L 9/22* (2013.01); *B60M 1/36* (2013.01); *B60L 2200/18* (2013.01);
(Continued)

(58) Field of Classification Search
CPC ................ B60L 5/42; B60L 9/22; B60M 1/36
See application file for complete search history.

(56) References Cited

U.S. PATENT DOCUMENTS 8,151,955 B2 * 4/2012 Aubigny ................... B60L 3/00
191/2
2002/0139629 A1 * 10/2002 Nogaret .................... B60L 9/22
191/2

(Continued)

FOREIGN PATENT DOCUMENTS

CA          2755340 A1    9/2010
DE    102010029450 A1   12/2011
(Continued)

*Primary Examiner* — Jason C Smith
(74) *Attorney, Agent, or Firm* — Laurence Greenberg; Werner Stemer; Ralph Locher (57) ABSTRACT

An electrical circuit for a vehicle includes at least one electrical contact device for an intermittently detachable electrical connection to a vehicle-external electrical network, a vehicle-internal electrical network and at least one detector device which determines if a connection exists between the contact device and the vehicle-external network. The circuit has at least one switching device which closes the electrical connection between the contact device and the vehicle-internal network depending on the connection determined between the contact device and the vehicle-external network. A method for making contact and/or breaking contact of a vehicle with a vehicle-external electrical network is also provided.

12 Claims, 4 Drawing Sheets

(52) U.S. Cl.
CPC ....... *B60L 2200/26* (2013.01); *B60L 2220/42* (2013.01); *Y02T 10/646* (2013.01)

(56) References Cited

U.S. PATENT DOCUMENTS

| | | | | |
|---|---|---|---|---|
| 2003/0183468 | A1* | 10/2003 | Stitz | B60L 9/00 |
| | | | | 191/2 |
| 2005/0082133 | A1* | 4/2005 | Panetta | B60L 3/0023 |
| | | | | 191/2 |
| 2007/0000744 | A1* | 1/2007 | Craig | B60L 5/205 |
| | | | | 191/2 |
| 2012/0226398 | A1* | 9/2012 | Castle | B60L 5/36 |
| | | | | 701/22 |
| 2013/0057204 | A1* | 3/2013 | Vollenwyder | B60L 5/005 |
| | | | | 320/108 |
| 2016/0200205 | A1* | 7/2016 | Bolik | B60L 11/1816 |
| | | | | 701/22 |
| 2017/0240051 | A1* | 8/2017 | Noack | B60L 5/42 |

FOREIGN PATENT DOCUMENTS

| | | |
|---|---|---|
| EP | 2275300 B1 | 11/2013 |
| JP | 09261803 A | 10/1997 |
| WO | 2013171186 A1 | 11/2013 |

* cited by examiner

ELECTRICAL CIRCUIT FOR A MOTOR VEHICLE AND METHOD FOR ESTABLISHING CONTACT AND/OR TERMINATING CONTACT OF A VEHICLE WITH A VEHICLE-EXTERNAL ELECTRICAL NETWORK

BACKGROUND OF THE INVENTION

Field of the Invention

The invention relates to an electrical circuit for a vehicle, comprising at least one electrical contact means for intermittently detachable electrical connection to an external electrical network and to an in-vehicle electrical network.

The invention also relates to a method for making and/or breaking contact of a vehicle with an external electrical network.

Said circuit and method are disclosed, for example, in DE 102010029450 A1 and are used for a vehicle which is intermittently connected to an external electrical network in order to charge its energy storage device. When the vehicle leaves such a power-feeding section, the external power feed to an energy storage device is interrupted by the contact breakaway. The power-feeding device of the external network is, for example, an overhead line, a soffit conductor rail, a third rail or similar. Said vehicle can be, for example, a tram, an electric bus or a similar vehicle. Due to transient reactions in the DC system, e.g. the application of three-phase AC to the vehicle's traction motor, current continues to flow across the opening contacts points between contact means and external network, possibly resulting in sparking. In DC applications, the spark is not self-extinguishing, since, in contrast to alternating current, there is no zero crossing of the current. The spark can be extinguished by increasing the gap between the contacts. However, this uncontrolled extinguishing only works up to a certain maximum current, depending on overhead line geometries and the distances from other conductive parts. If the maximum current is exceeded, in unfavorable configurations this may result in sparkover to conductive parts of the vehicle or wayside installations which may be damaged or destroyed thereby. These sparkovers can also be promoted by conductive contaminations or moisture.

DE 102010029450 A1 describes a circuit and a method whereby spark breakaway and other disadvantages can be prevented. However, for this purpose it is advantageous to plan very precisely the timing of this action prior to the ending of contact between the contact means and the energy source. On the one hand, the vehicle must be able to top up its energy storage device for as long as possible. On the other hand, however, the method described in DE 102010029450 A1 must be initiated in good time in order to be able to quench the supply current before the contact means, e.g. a pantograph, is detached. In DE 102010029450 A1, this is achieved by a wayside detection means comprising RFID elements or balises, for example, which transmit appropriate location information as to when the DE 102010029450 A1 action is to be taken.

The detection means used are usually disposed on the track or roadway, i.e. in each case externally to the vehicle. Consequently, e.g. when the route is altered, the signaling also has to be altered, which can be very expensive. In addition, the vehicle and wayside signaling manufacturers are often different, which can result in interfacing problems.

BRIEF SUMMARY OF THE INVENTION

The object of the present invention is therefore to provide a circuit and a method of the type mentioned in the introduction which is less dependent on external systems.

This object is achieved for the circuit mentioned in the introduction by at least one detector device which determines whether a connection exists between the contact means and the external network, and by at least one switching means which establishes the electrical connection between the contact means and the in-vehicle network depending on the connection determined between the contact means and the external network.

This object is achieved by the method mentioned in the introduction as follows: it is determined whether a connection exists between the contact means and the external network, an electrical connection between at least one in-vehicle network and at least one contact means designed to electrically connect the vehicle to the in-vehicle network is cut prior to contact making and/or breaking, and contact making and/or breaking takes place with the contact means and an in-vehicle network disconnected from one another.

The advantage of the solution according to the invention is that the contact making and/or breaking between contact means and external network is used as a signal, thereby obviating the need for additional wayside sensor systems. As the electrical connection between external network and internal network is initially cut by the switching means, the DE 102010029450 A1 action can be used for contact between contact means and external network.

The inventive solution can be further developed by mutually dependent advantageous embodiments which will be described below.

Thus the detector device can be designed such that, with the contact means and the in-vehicle network disconnected from one another, it determines whether a connection exists between the contact means and the external network. The detector device outputs a signal indicative of the connection, e.g. to a control unit of the vehicle. In particular, an electrical connection between the contact means and the external network can be tested. The advantage of this is that the detector device can manage without maintenance-intensive sensors, such as photoelectric barriers, feelers or proximity switches which test the contact of the contact means with the external network. This enables the wear or rather the maintenance requirement of the circuit according to the invention to be reduced.

In addition, the circuit can have at least one distance measuring device which outputs a signal indicative of a distance traveled by the vehicle. In particular, the detector device can be linked to the distance measuring device. The advantage of this is that only the making of contact between the contact means and the external network needs to be detected and, if the length of the section where there is contact with the energy source is known, the time or position of detachment of the contact means from the energy source can be calculated in advance. In order to simplify the circuit, the detector device can be disposed between the contact means and the switching means.

Furthermore, the detector device can be a voltage measuring device with which a voltage present at the contact means when the connection between contact means and internal network is cut can be measured. The disconnection of the contact means and internal network in the vehicle makes it particularly easy to detect the voltage rise in the contact means when contact is made with the external network. It is therefore advantageous to measure the voltage rise as a variable indicative of contact making of the contact means with the external network. A voltage transformer is particularly suitable for this purpose.

In order to able to detect the contact making and/or breaking of the contact means individually for vehicles having a plurality of contact means, the circuit can have at least two contact means, at least two switching means and at least two detector units, and each contact means can be assigned at least one switching means and at least one detector unit.

In order to be able to utilize the advantages of the invention particularly well, the circuit in the internal network can have at least one energy storage device and/or drive.

In a further development of the method according to the invention, the breaking of contact between the contact means and the external network can be calculated in advance using the determined contact making of the contact means with the external network. The advantage of this is that only the making of contact needs to be detected. The contact breaking can be calculated in advance on the basis of the distance covered by the vehicle since contact making. The advantage of this is that route information is already available in the known vehicles and contact breaking can therefore be calculated in a simple manner.

In order to use an easily detectable indication for contact making, the contact making or breaking can be determined by a change in the voltage present at the contact means.

In order to improve the accuracy for determining contact making or contact breaking, the contact making and/or breaking can be compared with known information concerning the route of the vehicle. Route information is available in the vehicle via passenger information systems or train control systems and includes, among other things, the length of a stop or power-feeding section that is indicative of the length of contact with the external network or may be calculated therefrom.

In order to be able to check the measured times or positions, the contact makings of a plurality of contact means of the vehicle with the external network can be determined separately for each contact means.

BRIEF DESCRIPTION OF THE SEVERAL VIEWS OF THE DRAWING

The invention will now be described with reference to the accompanying drawings and the exemplary embodiments of the invention illustrated therein.

In the drawings.

DESCRIPTION OF THE INVENTION

Figure 1:
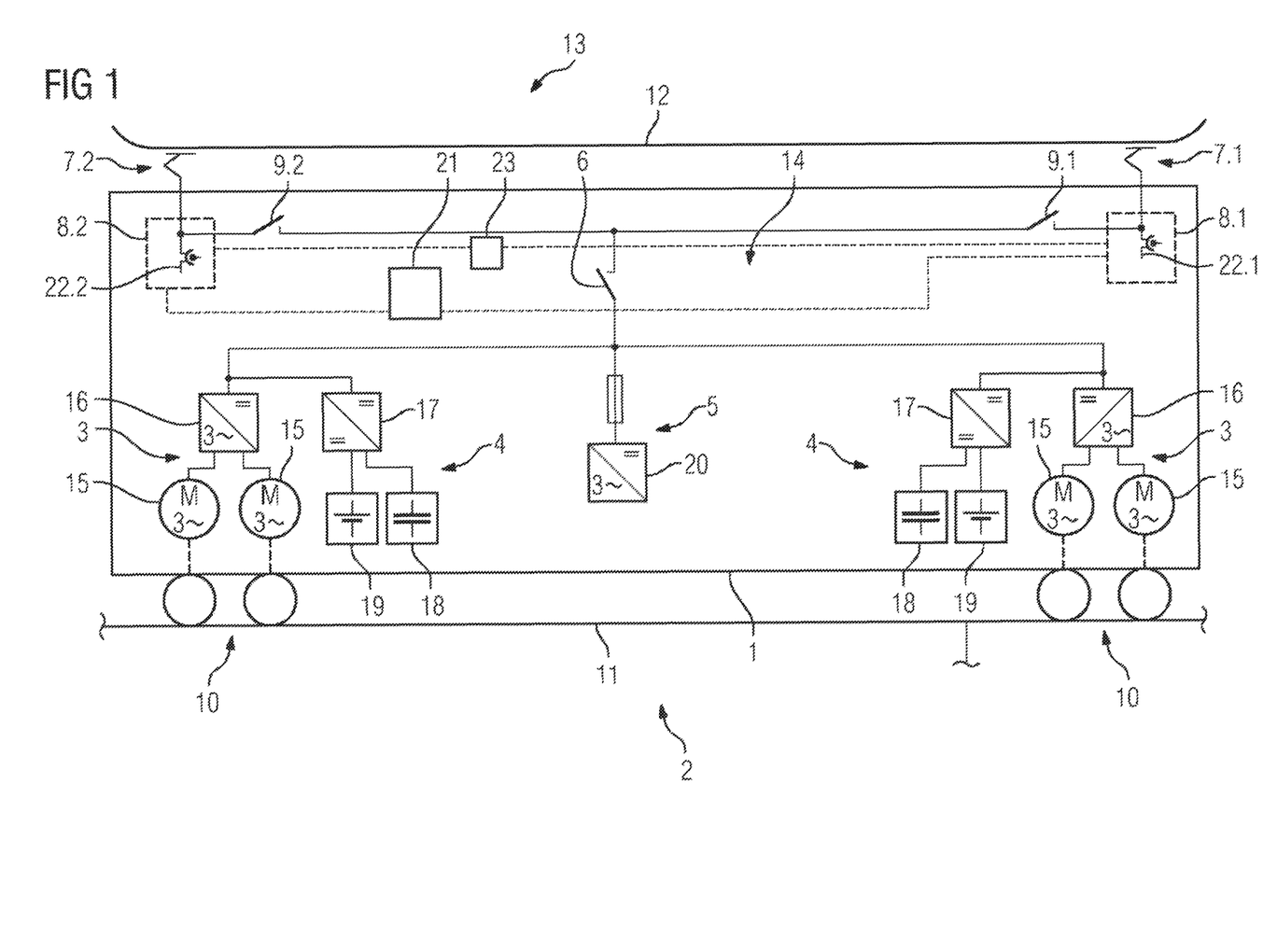
FIG. 1 schematically illustrates an exemplary embodiment of the inventive circuit and a vehicle.

The invention will first be described with reference to the exemplary embodiment in FIG. 1. FIG. 1 shows a vehicle 1 incorporating an exemplary embodiment of the electrical circuit 2 according to the invention. The schematic representation of the vehicle 1 in FIG. 1 can be, for example, a tram, an automobile, a bus, a truck or other rail vehicle.

The vehicle 1 has electric drives 3, energy storage devices 4, an on-board electrical system 5, a main switch 6, two contact means 7, two detector devices 8, and two switching means 9. The vehicle 1 also has wheels 10 disposed on a running surface 11 which can be, for example, a pair of rails, a road or a channel. Shown above the vehicle 1 in FIG. 1 is an overhead line 12 as part of an external electrical network 13. The drives 3, the energy storage devices 4, the on-board electrical system 5 and the main switch 6 constitute an in-vehicle electrical network 14 of the vehicle 1 in the exemplary embodiment in FIG. 1. The vehicle 1 additionally has a control unit 23 which controls said components. The detector device 8 can also be part of the control unit 23.

The vehicle 1 has, for example, two contact means 7, two detector devices 8 and two switching means 9. In order to differentiate between identical components, they are sometimes designated e.g. 7.1, 7.2. Nevertheless, 7.1, 7.2 are of identical design to 7. Reference characters without an extension, such as 7, for example, always also include the reference characters with extension, such as 7.1, for example.

The drives 3 in FIG. 1 each have, for example, two three-phase AC motors 15 and a power converter 16. Shown only schematically in FIG. 1, the three-phase AC motors 15 of the drives 3 are connected to the wheels 10 of the vehicle 1 to drive them.

The energy storage devices 4 each consist of a DC-DC converter 17, a capacitor 18 and a battery 19. The energy storage devices 4 can supply the electrical loads of the in-vehicle network 14, such as the drives 3 and the on-board electrical system 5, at least intermittently with electrical energy. The energy storage devices 4 can be charged with electrical energy which can be produced e.g. by the drives 3 during braking of the vehicle 1 or which is injected into the vehicle 1 by the external network 13, as will be explained in more detail below.

The on-board electrical system 5 is shown merely schematically in FIG. 1 and contains a power converter 20 representative thereof. The on-board electrical system 5 obviously comprises other electrical loads not shown here and other electrical components. The main switch 6 is disposed such that the in-vehicle network 14 can be disconnected from the contact means 7. During normal operation, the main switch 6 is closed.

The vehicle 1 also comprises a distance measuring device 21 which measures the distance traveled by the vehicle 1 and outputs a signal indicative of the distance, e.g. to the control unit 23. The distance measuring device 21 is of known design and is connected, for example, to the wheels 10 via appropriate sensors (not shown).

The contact means 7 are implemented, for example, as pantographs and mounted on top of the vehicle 1. The contact means 7 can establish electrical contact with the overhead line 12 of the external power network 13 in per se known manner in order to supply e.g. the drives 3 and/or the energy storage devices 4 with electrical energy. For this purpose the contact means 7 are electrically connected to the in-vehicle network 14 via the main switch 6. Alternatively to the overhead line 12, the external network 13 can also have, for example, a soffit conductor rail, a third rail or similar for contact with the contact means 7.

The detector devices 8 each have a voltage measuring device 22 which is implemented as a voltage transformer in the exemplary embodiment in FIG. 1. The detector devices 8 are each connected electrically to the contact means 7 and, in terms of signal transmission, to the distance measuring device 21.

In the exemplary embodiment in FIG. 1, the switching means 9 are implemented as switches. Alternatively, they can also be a relay, contactor or similar. The switching means 9 are each disposed between the detector device 8 and the in-vehicle network 14. The detector device 8 is in turn disposed between the switching means 9 and the contact means 7 in each case.

In order to prevent arcing and similar undesirable occurrences when the vehicle 1 makes and/or breaks contact with the overhead line 12 of the external network 13, the action described in DE 102010029450 A1 is taken in the vehicle 1. The reader is hereby referred to DE 102010029450 A1, and the contents thereof are deemed to be wholly incorporated in this patent application. The circuit 2 in FIGS. 1-6 is implemented in accordance with DE 102010029450 A1. In order to determine a suitable time or position for initiating the method disclosed in DE 102010029450 A1, the present invention uses the time or rather the event of contact making and/or of determined contact breaking of the contact means 7 with the overhead line 12.

The making or breaking of contact with the overhead line 12 by the vehicle 1—i.e. entry to and exit from a power-feeding section 24—according to the present invention will now be described with reference to FIGS. 2-6.

FIGS. 2-6 show different positions of the vehicle 1 from FIG. 1 relative to the overhead line 12 of the power-feeding section 24. Even though the vehicle 1 is only represented extremely schematically in FIGS. 2-6 and a number of components have been omitted for simplicity's sake, this is nevertheless the vehicle 1 as described above with reference to FIG. 1 and shown therein. FIGS. 2-6 show the vehicle 1 traveling on the running surface 11 from left to right relative to the fixed overhead line 12 in the power-feeding section 24.

Figure 2:
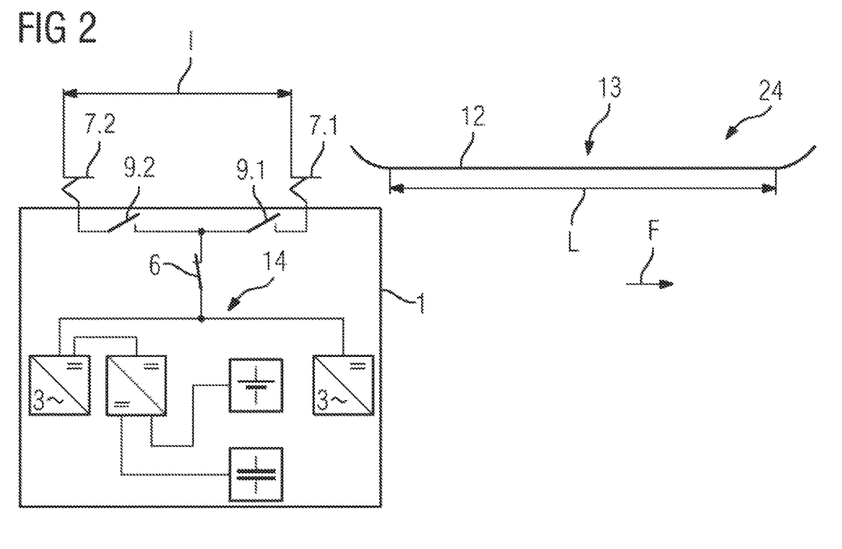
FIGS. 2-6 show the vehicle and the circuit from FIG. 1 in different positions.

In FIG. 2, the vehicle 1 is not yet in contact with the overhead line 12. In this position, the drives 3 propelling the vehicle 1 in a direction of travel F are supplied with electrical energy by the energy storage devices 4. In FIG. 2, the two switching means 9 are open, so that the contact means 7 are each disconnected from the internal network 14.

Figure 3:
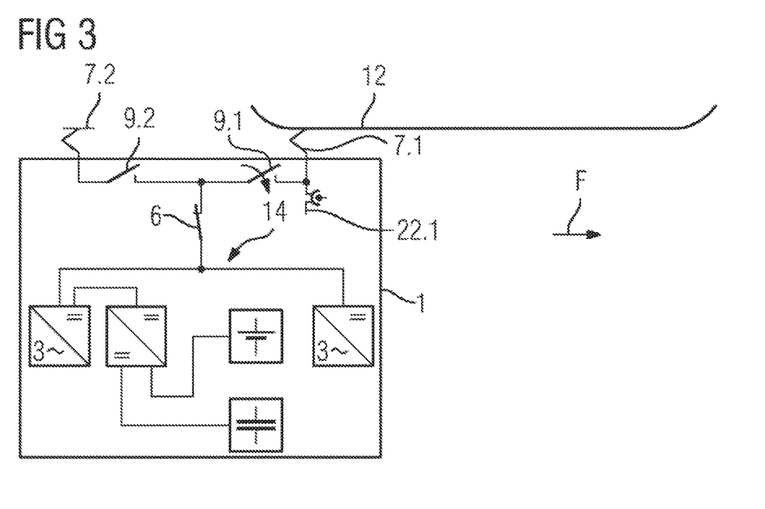

FIG. 3 shows the time or position in which the front contact means 7.1 of the vehicle 1 in a direction of travel F makes contact with the overhead line—i.e. the establishment of contact with the external network by said contact means 7.1. In FIG. 3, contact between the first contact means 7.1 and the overhead line 12 has been established, so that the contact means 7.1 is at the potential of the overhead line 12. As a voltage, e.g. 750 volts, is present on the overhead line 12, this voltage also appears in the contact means 7.1. The switching means 9 disconnects the contact means 7 from the in-vehicle network 14, so that only the front contact means 7.1 and the detector device 8.1 thereof is at the potential of the overhead line 12. The voltage rise in the contact means 7.1 during contact making with the overhead line 12 is detected by the detector device 8.1 using the voltage measuring device 22.1. As a result of the voltage rise in the contact means 7.1, the detector device 8.1 therefore detects that contact of the front contact means 7.1 with the overhead line 12 has been established. At this position, the signal of the distance measuring device is recorded in order to store the position of the vehicle 1 at contact making. From the movement relative to this position, the position of contact breaking, for example, can be calculated in advance, as will be described below. According to the present invention, the contact making determined triggers the action described in DE 102010029450 A1. In the contact position, the external network 13 is available to the vehicle 1, but still isolated from the internal network 14. As a result of the internal network 14 being disconnected from the external network 13 by the switching means 9, the contact determined can be used as a starting signal for the DE 102010029450 A1 action. The switching means 9 is then closed by the control unit 23 and energy flows.

Figure 4:
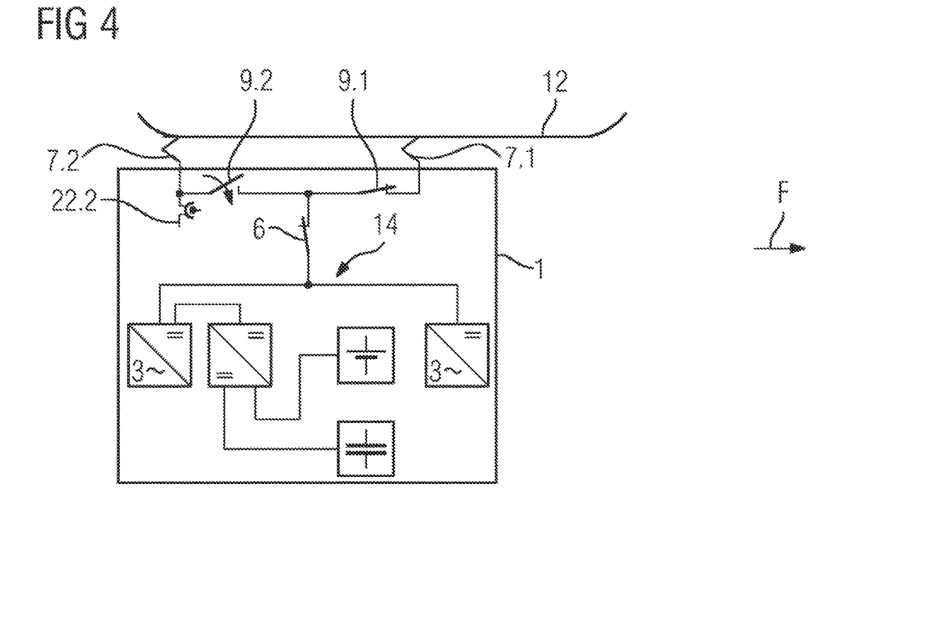

FIG. 4 shows the time when the second, rear contact means 7 comes into contact with the overhead line 12. Before this point in time, the rear switching means 9.2 is open, so that the internal network 14 is isolated from the rear contact means 7.2. When the rear contact means 7.2 comes into contact with the overhead line 12, the voltage rises in the contact means 7.2, which is measured by the voltage transformer of the voltage measuring device 22.2. The detector device 8.2 forwards a signal indicative of the contact making to the control unit 23 which then closes the switch 9.2. The position of the vehicle 1 at contact making of the contact means 7.2 is recorded on the basis of the signal of the distance measuring device 21.

Once the switch 9.2 is closed and the two contact means 7 are in contact with the overhead line 12, energy is injected into the vehicle 1 via both contact means 7. The injection via a plurality of contact means 7 is advantageous, as the vehicle 1 normally makes a stop in the region of the overhead line 12 and the energy flow is advantageously distributed over a plurality of contact means 7. Thus overloads can be prevented.

Figure 5:
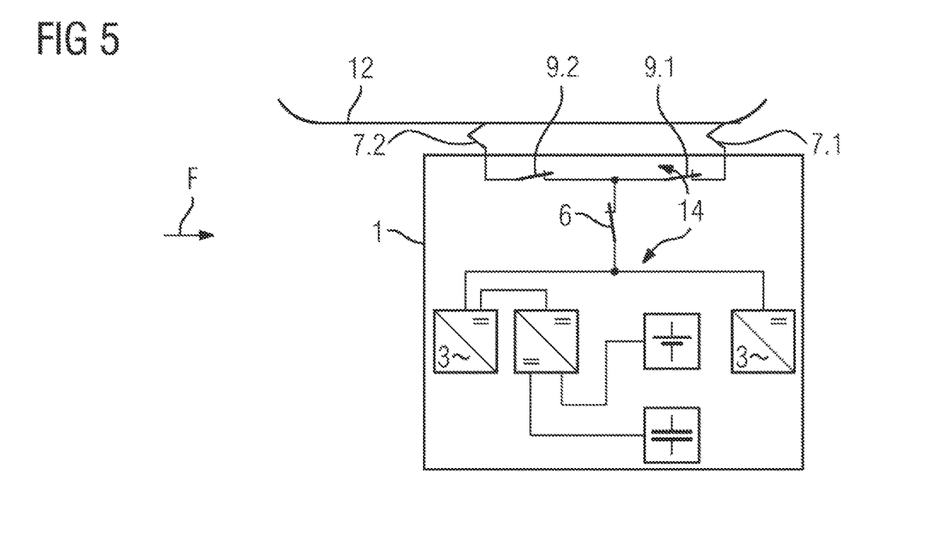
Figure 6:
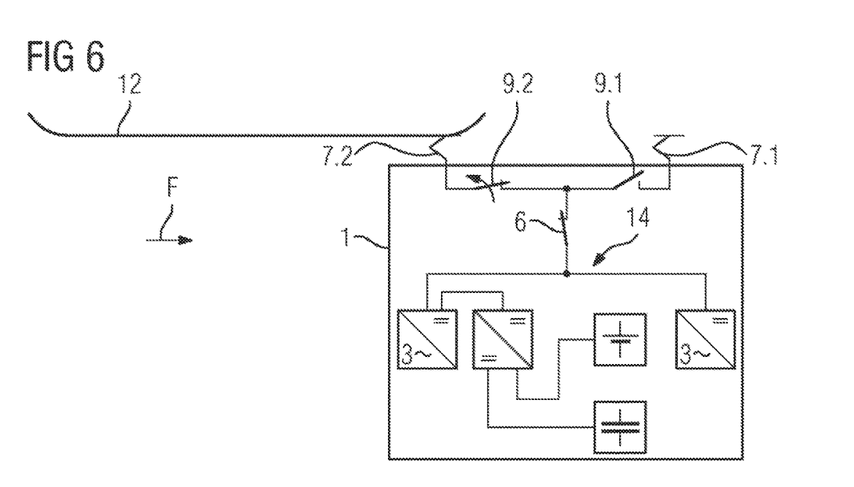

FIGS. 5 and 6 show the vehicle 1 in two positions during the exit of the vehicle 1 from the power-feeding section 24 in which the overhead line 12 is disposed.

FIG. 5 shows the position in which the front contact means 7.1 loses contact with the overhead line 12. As the length L of the power-feeding section 24, i.e. of contact with the overhead line 12, is known, the control unit 23 can calculate in advance the time or position of contact breaking. The data and information from the distance measuring device 21 is used for this purpose. The switch 9.1 can therefore be opened by the control unit 23 before contact is lost. Obviously the DE 102010029450 A1 action can be taken prior to opening of the switching means 9.1. After opening of the switching means 9.1, the trailing contact means 7.2 now takes over the traction current transferred from the overhead line 12 to the vehicle 1. The voltage measuring device 22.1 on the leading, now isolated contact means 7.1 now detects, on the basis of the voltage drop across the contact means 7.1, the position where contact with the overhead line 12 will be lost when the vehicle leaves the power-feeding section. This provides a synchronization point with which the present distance count and the pre-calculated position of contact breaking can be checked and corrected if necessary.

FIG. 6 shows the position in which the rear contact means 7.2 of the vehicle 1 loses contact with the overhead line 12. In order to maintain connection to the overhead line 12 for as long as possible, the switch 9.2 is kept closed until the pre-calculated contact breaking. However, at a suitable point, controlled detachment of the trailing contact means 7.2 is initiated according to the principle described in DE 102010029450 A1. After contact breaking, the switch 9.2 is opened so that the initial state is restored for entry to the next power-feeding section 24 having an overhead line 12, as shown in FIG. 2.

In embodiments having just one contact means 7, the length L of the overhead line 12 in the power-feeding section 24 is provided via, for example, a passenger information system or train control system or similar. The breaking of contact can be calculated in advance from the length L and the determined contact making. The embodiments of DE 102010029450 A1 can therefore be started at a suitable point in order to prepare for problem-free detachment of the contact means 7 from the overhead line 12.

If, as in the exemplary embodiment in FIGS. 1-6, two contact means 7 are present on the vehicle 1, the advance information concerning the length L can also be dispensed with if necessary. For this purpose, similarly to the exit from the power-feeding section 24 as described with reference to FIG. 5, the switch 9.1 remains open throughout the power-feeding section 24 and the leading contact means 7.1 in the direction of travel F remains isolated. The voltage measured at the isolated contact means 7.1 is compared with the voltage at the current-carrying contact means 7.2. Both voltages are equal in the region of the overhead line 12. If the isolated leading contact means 7.1 reaches the non-feeding section beyond the overhead line 12, the voltage present becomes zero. As the distance 1 between the two contact means 7 is known, the time or position of contact breaking of the trailing contact means 7.2 can be calculated in advance and checked using the distance measuring device 21. The 102010029450 A1 action is taken sufficiently early to prepare for contact breaking of the trailing contact means 7.2.

The power-feeding section 25 generally has, at the ends, a ramp, slope or similar in order to facilitate threading-in of the contact means 7. This can result in a certain tolerance for the length L over which the contact means 7 has contact with the overhead line 12. In order to compensate this, the point of contact can be experimentally determined in advance and then an appropriate tolerance built into the distance measurement.

For completely overhead-line-free operation between the stopping points of the vehicle 1, a large charging power is required in the stop zone of the overhead line 12. Within the usual stop time of up to 30 seconds, the energy which will be used by the drives 3 and the on-board electrical system 5 of the vehicle 1 over a subsequent travel time of 60-90 seconds must be injected via the contact means 7. This energy must be conveyed via the stationary point contacts between contact means 7 and overhead line 12. Therefore, as already mentioned above, to optimize the overhead line 12 as the power-feeding device and the contact means 7 as the current collector of the vehicle 1, usually at least two contact means 7 are used. With at least two contact means 7, the point of contact breaking can be very accurately detected if each contact means 7 is provided with an assigned switch 9 and an assigned detector device 8, as shown in the embodiment in FIGS. 1-6. In the overhead-line-free section, the switches 9 are open. When the first contact means 7.1 comes into contact with the overhead line 12, as described above with reference to FIG. 2, and distance measurement by means of the distance measuring device 21 has been started, the contact making of the trailing contact means 7.2 can be detected in the same way by means of the second detector device 8, as described above with reference to FIG. 4, and used as synchronization. From the comparison of the two values and possibly with weighting by an empirical value, a distance measurement tolerance can be matched via the distance measuring device 21 and kept as small as possible.

Alternatively to the voltage measuring device 22, the detector device 8 can also comprise other sensors which detect contact of the contact means 7 with the overhead line 12. For example, a photoelectric barrier, proximity switch or feeler can be used here which detects displacement of the contact means 7 as the latter makes contact with the overhead line 12.

The invention claimed is:

1. An electrical circuit for a vehicle, the electrical circuit comprising:
    at least one electrical contact device for intermittently detachable electrical connection to an external electrical network and to an in-vehicle electrical network;
    at least one detector device for determining if a connection exists between said at least one electrical contact device and the external network;
    at least one switching device for closing an electrical connection between said at least one electrical contact device and the in-vehicle network depending on the connection determined between said at least one electrical contact device and the external network; and
    at least one distance measuring device for outputting a signal indicative of a distance traveled by the vehicle.

2. The circuit according to claim 1, wherein said at least one detector device is configured to determine if a connection exists between said at least one electrical contact device and the external network if a disconnection occurs between said at least one electrical contact device and the in-vehicle network.

3. The circuit according to claim 1, wherein said at least one detector device includes at least one voltage measuring device for measuring a voltage present at said at least one electrical contact device if a disconnection occurs between said at least one electrical contact device and the in-vehicle network.

4. The circuit according to claim 3, wherein said at least one voltage measuring device has at least one voltage transformer.

5. The circuit according to claim 1, wherein:
    said at least one electrical contact device includes at least two electrical contact devices;
    said at least one switching device includes at least two switching devices;
    said at least one detector device includes at least two detector units; and
    each of said electrical contact devices is associated with at least one respective switching device and at least one respective detector unit.

6. The circuit according to claim 1, wherein the in-vehicle network includes at least one of at least one energy storage device or at least one drive.

7. A method for at least one of making or breaking contact of a vehicle with an external electrical network, the method comprising the following steps:
    providing at least one contact device for electrically connecting the vehicle to the external network;
    determining if a connection exists between the at least one contact device and the external network;
    prior to at least one of contact making or breaking, disconnecting an electrical connection between an in-vehicle electrical network and the at least one contact device;
    carrying out at least one of contact making or breaking when the at least one contact device and the in-vehicle electrical network are disconnected from one another; and
    calculating the contact breaking in advance based on a distance traveled by the vehicle since contact making.

8. The method according to claim 7, which further comprises calculating the breaking of the connection of the at least one contact device with the external network in advance by using the determination of the connection of the at least one contact device with the external network.

9. The method according to claim 7, which further comprises closing the electrical connection between the in-vehicle network and the contact device after the determination of the contact making between the contact device and the external network.

10. The method according to claim 7, which further comprises providing the at least one contact device as a plurality of contact devices, and separately determining a plurality of contact makings by the plurality of contact devices with the external network for each of the plurality of contact devices.

11. A method for at least one of making or breaking contact of a vehicle with an external electrical network, the method comprising the following steps:
- providing at least one contact device for electrically connecting the vehicle to the external network;
- determining if a connection exists between the at least one contact device and the external network;
- prior to at least one of contact making or breaking, disconnecting an electrical connection between an in-vehicle electrical network and the at least one contact device;
- carrying out at least one of contact making or breaking when the at least one contact device and the in-vehicle electrical network are disconnected from one another; and
- comparing the determination of the at least one of contact making or breaking with known information about a route of the vehicle.

12. The method according to claim 7, which further comprises determining the contact making or breaking by using a change in voltage present at the contact device.

\* \* \* \* \*